United States Patent
Al-Khudairi

(10) Patent No.: US 8,724,612 B2
(45) Date of Patent: May 13, 2014

(54) ADAPTIVE TIMERS FOR POLLING IN A MOBILE WIRELESS DEVICE

(75) Inventor: Abdul-Munem Al-Khudairi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 445 days.

(21) Appl. No.: 12/984,495

(22) Filed: Jan. 4, 2011

(65) Prior Publication Data

US 2012/0170569 A1    Jul. 5, 2012

(51) Int. Cl.
*H04J 3/16*   (2006.01)

(52) U.S. Cl.
USPC .......................................... 370/346; 709/226

(58) Field of Classification Search
USPC .................................. 370/346, 310; 709/226
See application file for complete search history.

(56) References Cited

U.S. PATENT DOCUMENTS

| | | | |
|---|---|---|---|
| 5,566,351 A * | 10/1996 | Crittenden et al. | 710/46 |
| 6,747,993 B2 | 6/2004 | Rinchiuso | |
| 7,590,100 B2 | 9/2009 | Smith et al. | |
| 8,094,592 B2 * | 1/2012 | Roy | 370/310 |
| 8,392,923 B2 * | 3/2013 | Walters | 718/102 |
| 2010/0077035 A1 | 3/2010 | Li et al. | |
| 2010/0214942 A1 | 8/2010 | Du et al. | |
| 2010/0306392 A1 * | 12/2010 | Fell et al. | 709/228 |

* cited by examiner

*Primary Examiner* — Wei Zhao

(74) *Attorney, Agent, or Firm* — Womble Carlyle Sandridge & Rice LLP

(57) ABSTRACT

A method for adapting data retrieval polling in a mobile wireless device is disclosed. The mobile wireless device is configured in an adaptive pull mode and polls a remote server when a data retrieval polling timer expires. Data retrieval information is stored in the mobile wireless device and the data retrieval polling timer is updated to a value based on the stored data retrieval information. The data retrieval information includes time intervals between successive polls or time delay intervals between data arrival at and retrieval from the remote server. Updates are based on weighted moving averages of the data retrieval information.

25 Claims, 9 Drawing Sheets

300

| Polling Method | Average Delay | Null Fetches |
|---|---|---|
| Fixed 15 Minutes | 0 Minutes | 4 |
| Fixed 30 Minutes | 15 Minutes | 0 |
| Fixed 60 Minutes | 30 Minutes | 0 |
| Adaptive | 0 Minutes | 1 |

| Polling Method | Average Delay | Null Fetches |
|---|---|---|
| Fixed 15 Minutes | 0 Minutes | 30 |
| Fixed 30 Minutes | 0 Minutes | 14 |
| Fixed 60 Minutes | 0 Minutes | 6 |
| Adaptive | 0 Minutes | 4 |

Figure 5

ADAPTIVE TIMERS FOR POLLING IN A MOBILE WIRELESS DEVICE

TECHNICAL FIELD

The described embodiments relate generally to wireless mobile communications. More particularly, a method is described for adapting polling time intervals between a mobile wireless device and a remote server in a wireless network.

BACKGROUND OF THE INVENTION

Mobile wireless devices, such as a cellular telephone or a wireless personal digital assistant, can provide a wide variety of communication services including, for example, voice communication, text messaging, internet browsing, and electronic mail. Mobile wireless devices can operate connected to a wireless network to retrieve different types of stored data, including audio data (such as voice messages and audio clips), text data (such as email) and video data (such as video clips). The stored data can be located on one or more servers remotely situated and separated from the mobile wireless device. An application resident on the mobile wireless device can retrieve some of the remotely stored data to store locally on the mobile wireless device and to display to a user thereof. The stored data at the server can dynamically change over time, e.g. a new voice message can be received and placed in a voice mail queue, new email can arrive in an email database, and additional video clips can be added to a video database repository. The user of the mobile wireless device can desire to receive updated stored data from the remote server with minimal delay.

A resource efficient method to receive dynamically changing information at a mobile wireless device from a remote server can be a "push" service, in which the dynamically changed information is "pushed" to the mobile wireless device by the remote server as the information becomes available. Some applications can "push" a notification while waiting until the user requests to retrieve the complete new information, such providing a voice mail notification, while other services can push the complete updated information as available, such as a background software update. Some services and servers, however, can be incapable of being configured for a "push" service, and instead the mobile wireless device can be required to "pull" the dynamically changing data based on an intermittent polling method.

The mobile wireless device can poll the remotely located server at fixed time intervals based on a user setting. Frequent polling for new data can minimize the time delay that data waits at the remote server before being fetched; however, the frequency of polling can be mismatched to the frequency at which the new data arrives at the remote server. As polling by the mobile wireless device can require an active connection between the mobile wireless device and the wireless network, the mobile wireless device can consume power during the polling period. When the mobile wireless device polls the remote server and finds that no new data, the mobile wireless device unnecessarily consumes battery power, as the mobile wireless device could have remained in an idle state instead. Thus, in the absence of a "push" data service, reducing the frequency of polling when using a "pull" data service can increase the battery life of the mobile wireless device. In addition, by reducing the frequency of polling, network resource consumption, due to an exchange of messages between the mobile wireless device and the wireless network to poll for new data, can also be reduced.

Applications on mobile wireless devices can offer a limited selection of fixed time intervals at which to set the frequency of polling for new data. Frequent polling can minimize delay incurred when new data arrives at the server but can increase power consumption at the mobile wireless device. Infrequent polling can increase delay before new data is received by the mobile wireless device, especially considering that the frequency at which data can arrive at a remote server can change substantially throughout a 24 hour daily cycle or for different days of a week. Fixed polling periods can be inflexible and can not adapt to changing patterns of usage for a given user of the mobile wireless device. For example, a user can receive an email at the remote server every 15 minutes during the day but every 2 hours at night. A single non-adaptive polling period setting on the mobile wireless device can be inappropriately matched to the frequency of data arrival at the server. Similarly, a user can receive email frequently during a work period and infrequently during a weekend or a vacation period. A method to adapt polling timers to a user's data usage pattern rather than require the user to configure the polling time interval manually and repeatedly to different fixed values can improve the user's experience of the mobile wireless device.

Thus there exists a need to adapt polling time intervals between a mobile wireless device and a remote servicer in a wireless network.

BRIEF DESCRIPTION OF THE DRAWINGS

The invention and the advantages thereof may best be understood by reference to the following description taken in conjunction with the accompanying drawings.

FIG. 3 summarizes results for the polling intervals shown in FIG. 2.

FIG. 5 summarizes results for the polling intervals shown in FIG. 4.

SUMMARY OF THE DESCRIBED EMBODIMENTS

Figure 1:
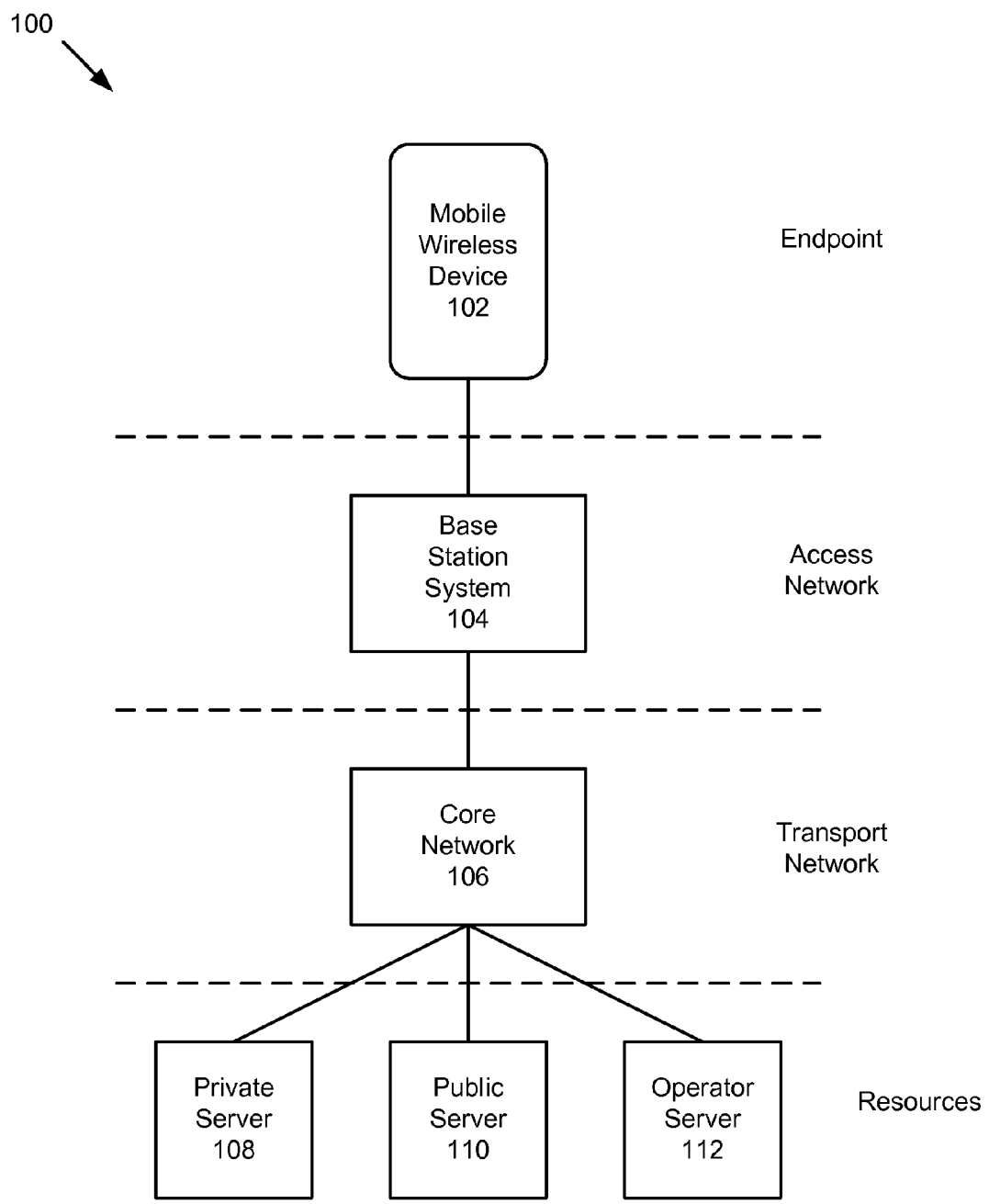
FIG. 1 illustrates a mobile wireless device connected through a wireless network to a remote server.

The described embodiments relate generally to wireless mobile communications. More particularly, a method is described for adapting polling time intervals between a mobile wireless device and a remote server in a wireless network.

In one embodiment, a method for adapting data retrieval polling in a mobile wireless device is described. The method includes at least the following steps, executed while the mobile wireless device is configured in an adaptive pull mode. The mobile wireless device polls a remote server when a data retrieval polling timer expires. The mobile wireless device stores data retrieval information and updates the data retrieval polling timer to a value based on the stored data retrieval information. In some embodiments, the data retrieval information includes time intervals between successive data retrieval polls that returned data. In other embodiments, the data retrieval information includes time delay intervals between when data arrives at the remote server and when the mobile wireless device retrieves the data.

In another embodiment, a mobile wireless device configured to adapt data retrieval polling is described. The mobile wireless device includes at least a transceiver and an application processor. The transceiver is configured for transmitting and receiving wireless signals from a wireless network. The application processor is configured for enabling an adaptive pull mode for the mobile wireless device. The application processor is also configured for polling a remote server when a data retrieval polling timer expires and storing data retrieval information. The application processor is further configured to update the data retrieval polling timer to a value based on the stored data retrieval information. In some embodiments the data retrieval information includes inter-arrival time intervals between successive data received for a user of the mobile wireless device at the remote server. In further embodiments, the data retrieval polling timer value is updated based on a moving weighted average of recent inter-arrival time intervals.

In a further embodiment, a non-transitory computer readable medium for storing non-transitory computer program code executed by a processor for adapting data retrieval timing by a mobile wireless device from a remote server is described. The non-transitory computer readable medium includes non-transitory computer program code executed while the mobile wireless device is in an adaptive pull mode. The non-transitory computer program code is configured for polling a remote server by the mobile wireless device when a data retrieval polling timer expires. The non-transitory computer program code is also configured for storing data retrieval information. The non-transitory computer program code is further configured for updating the data retrieval polling timer to a value based on the stored data retrieval information. In some embodiments, the non-transitory computer program code is further configured for increasing the data retrieval polling timer value when a most recent data retrieval poll retrieved no data and a current data retrieval polling timer value is less than a maximum polling interval value. The non-transitory computer program code is also configured for decreasing the data retrieval polling timer value when the most recent data retrieval poll retrieved data and the current data retrieval polling timer value is greater than a minimum polling interval value.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Mobile wireless devices, such as a cellular telephone, tablet computer or wireless laptop computer can provide a user of the mobile wireless device a broad array of services through a wireless network. Some of the services offered on the mobile wireless device can provide information stored at least temporarily on a remote server and retrieved later to output to the user of the mobile wireless device. Common services that can use remote storage include voice mail, email, social networking databases and other "cloud computing" services. For certain services, a "push" mode can be provided to the user of the mobile wireless device enabling data received at the remote storage to be forwarded to the mobile wireless device soon after it is received. A mobile wireless device that can be connected to the wireless network can receive the forwarded data with minimal delay. Some services, however, cannot provide a push mode and instead can require the mobile wireless device to retrieve the updated data from the storage location using a "pull" mode.

Configuration of the "pull" mode on the mobile wireless device can require the user of the mobile wireless device to select from among a limited set of fixed polling time intervals. The fixed polling timer interval value can be used for all "pull" mode services or can be customized for each "pull" mode service offered on the mobile wireless device individually. The mobile wireless device can poll the remote server regularly after a polling timer expires and retrieve any data accumulated and awaiting delivery at the remote server. The time interval between successive polls can be mismatched to the frequency at which the data can be received at the server. The frequency of data arrival at the remote server can also vary markedly at different times. For example messages, such as for a voice mail service or an email service, can arrive at the remote server more frequently during the day and less frequently at night. A single fixed time interval setting for the "pull" mode can be suboptimal for use throughout a daily cycle.

Adapting the polling time intervals can more closely match the frequency of polling and retrieval of data from the remote server to the frequency of data arrival at the remote server. Adapting the polling time intervals based on historical data retrieval information can minimize delay of delivery of the data from the remote server to the mobile wireless device. The adaption can also minimize the frequency of polls that retrieve no data, thus reducing power consumption at the mobile wireless device and conserving scarce network signaling radio resources. Adaption methods can be tailored by the user to meet a desired characteristic, such as to vary based on time of day or day or week. The adaption can also be chosen to vary based on an activity state as stated by the user of the mobile wireless device, such as working or on vacation.

The polling timer intervals can be updated based on a history of time intervals measured or calculated by the mobile wireless device. A time interval can include a time between successive polls or a time between successive successful polls by the mobile wireless device. A time interval can also include a time between a successful poll that retrieves data from the remote server by the mobile wireless device and a time that the same data arrived at the remote server. This time interval can represent a "delay" that the data can incur while awaiting delivery to the mobile wireless device.

Adaptation of the polling time interval can increase the time interval when no data is retrieved by one or more recent polls or decrease the time interval when successive polls retrieve data. The adaptation of the polling time interval can minimize a moving average of time interval values measured or calculated by the mobile wireless device, such as a moving average of time delay interval values. The moving average can weight one or more recent values of time delay intervals more heavily that time delay interval values corresponding to further back in a historical record. The weighting values can also be chosen based on a user selected rate adaption preference. A historical profile can be created for a user based on a daily or weekly cycle of monitored data retrieval information, and rate adaption can be tailored to the historical profile. For example, the rate adaption can include varying settings based on time of day or day of week to match a user's historical data retrieval pattern.

FIG. 1 illustrates a mobile wireless device 102 connected to one or more remote servers 108/110/112 through a wireless network. The mobile wireless device 102 can be considered an "endpoint" for a wireless network and can transmit and receive packetized data and signaling messages with to and from the wireless network. The mobile wireless device 102 can be connected through one or more radio resources to a base station system 104 in a wireless access network. The radio resources in the access network can be shared among multiple mobile wireless devices 102, and as such the radio resources can be dynamically allocated among multiple users.

The wireless network can include a core network 106 that can serve as a transport network component to connect the mobile wireless device 102 to a multitude of remotely located resources, such as remote servers 108/110/112 or other remote storage devices. A user of the mobile wireless device 102 can access stored data on the remote servers 108/110/112 through an application resident on the mobile wireless device 102. Based on different services to which the user of the mobile wireless device 102 can subscribe, or for which the mobile wireless device 102 can be configured, the user can access data for the different services located on the remote servers 108/110/112. For example the mobile wireless device 102 can access corporate email located on a private server 108, a database of video clips located on a public server 110 or a voice mailbox of stored messages located on an operator server 112. Data for each of these services can update at different rates throughout a given day or week. For example, email can be received at the remote private server 108 frequently during a day and infrequently at night, or more often during a weekday and less often during a weekend. Similarly databases available on the public server 110 can be updated at particular times of day or particular days of the week.

The user of the mobile wireless device 102 can prefer to access data from the remote servers 108/110/112 soon after the data can be stored thereon. Some services can offer a "push" mode in which the updated stored data can be transferred to the mobile wireless device 102 when available. Alternatively, a notification can be "pushed" to the user of the mobile wireless device 102 to indicate that new data can be available for retrieval from the remote server 108/110/112 by the user of the mobile wireless device 102. Some services, however, can not offer a "push" mode and instead require that the user retrieve the updated data on demand. For example, the user of the mobile wireless device 102 can be required to check for new email messages from a remotely located private email server 108 using a "pull" mode to retrieve the updated data. Checking for new data from the remote server 108/110/112 can be manual based on a user input, such as opening an email application, or can be automatic, such as a background process polling the remote server 108/110/112 at regular time intervals specified by selecting a value for an interval timer in an application on the mobile wireless device 102. A fixed interval polling timer value, however, can be poorly matched to an actual inter-arrival time for data at the remote server 108/110/112, as arrival times can vary significantly over time.

A user can select a fixed interval polling timer value to match an expected frequency of new data arrivals at the remote server 108/110/112. Shorter values can be chosen during the day, when data can be expected to arrive more frequently, and longer values can be chosen during the night, when data can be expected to arrive less frequently. Repeatedly changing the fixed interval polling timer value, however, can be inconvenient for the user of the mobile wireless device 102. In addition, polling of the remote server 108/110/112 by the mobile wireless device 102 that results in a "null" retrieval, i.e. no new data can be available for retrieval, can consume battery power unnecessarily, thereby shortening the time required between battery recharging. The user can prefer that the polling timer differ based on a state of the device, such as more frequent polling when connected to a constant power source (e.g. AC outlet) and less frequent polling when powered by the internal battery. Flexible adaptive polling time intervals can offer increased battery life, decreased use of scarce network resources in the access network link, and decreased delay before stored data is retrieved.

Figure 2:
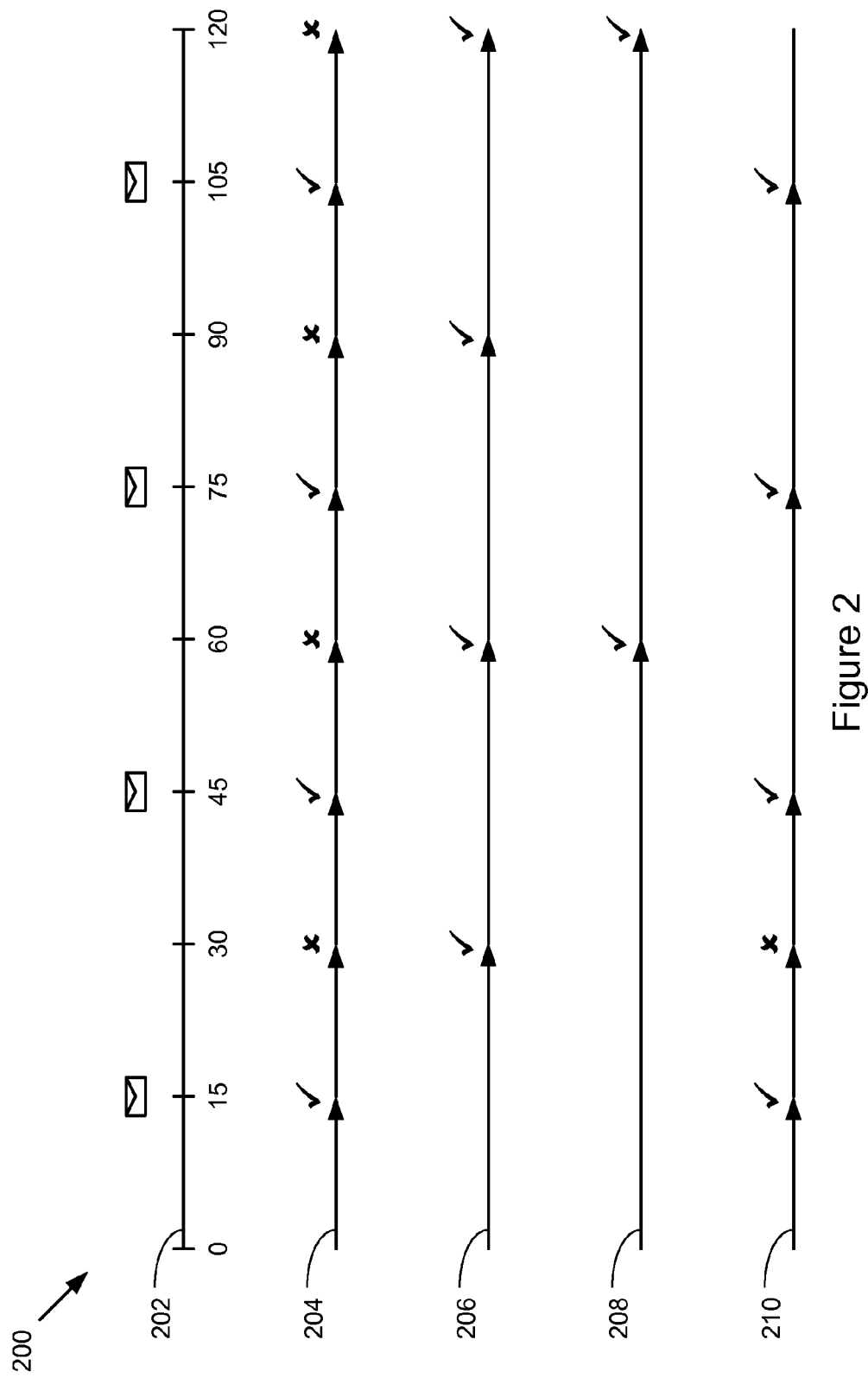
FIG. 2 illustrates different "pull" polling intervals for a medium frequency data traffic pattern.

FIG. 2 illustrates several different time interval polling patterns 200 for a service with a medium rate traffic pattern. Timeline 202 shows a new email data arriving at a remote server 108/110/112 every 30 minutes starting at the 15 minute mark. Timeline 204 illustrates a fixed time interval polling pattern using a fixed 15 minute interval between polls. A checkmark indicates a "successful" data retrieval poll, while an "x" mark indicates a poll in which no data is retrieved, i.e. an "unsuccessful" data retrieval poll. Frequent polling results in low delay as shown; however, extra polls also occur. When a fixed 15 minute interval value is used for a data retrieval polling timer and the data arrives instead at 30 minutes intervals as shown in FIG. 2, every other poll results in no data retrieval. Thus half of the polls unnecessarily occur, thereby wasting local battery power of the mobile wireless device 102 and radio resources for signaling messages exchanged between mobile wireless device 102 and the wireless network. Polling less frequently, namely at a fixed 30 minute interval value, as shown in timeline 206 matches the polling time interval to the data arrival interval exactly, with no unnecessary data retrieval polls. The data at the remote server 108/110/112 encounters a 15 minute delay because of the offset of the polling interval to the data arrival interval; however, in a real world scenario, the data would arrive more randomly (e.g. with a Poisson distribution for inter-arrival times). Polling even less frequently, namely at one hour intervals as shown in timeline 208, also results in no unnecessary polls; however, additional delay can occur. Thus, when selecting a fixed polling time interval, there can be a tradeoff between delay incurred by data at the remote server 108/110/112 before retrieval and the frequency of polls that return no data.

Timeline 210 illustrates an adaptive data retrieval polling time interval, in which the mobile wireless device 102 changes the polling time interval based on historical data retrieval information. Initially the polling interval can be set to a minimum value, such as 15 minutes between polls. With a short time interval between polls at the start, adaption to the actual received data at the remote server 108/110/112 can proceed more quickly. With a medium rate traffic pattern as shown in FIG. 2, the data received at the remote server 108/110/112 at 15 minutes and 45 minutes can be retrieved, while a poll at 30 minutes can return no data. As the two successful data retrievals occur 30 minutes apart, the adaptive data retrieval polling time interval can be increased to 30 minutes as shown, which then matches well to the medium rate data traffic pattern. If the data traffic pattern increased in frequency, then the polling time interval can be reduced until polls indicate no data retrieved. Similarly if the data traffic pattern decreased in frequency, then the polling time interval can be increased until repeated successive polls indicate data retrieved with minimal delay.

Adapting the polling interval can use one or more different metrics to determine a future polling time interval value. Ideally, every poll will return data, and data will incur minimal delay before being retrieved. A moving average of the number of data retrievals that return no data over a time interval can be used, and it can be preferred that the moving average be minimized. When a poll does return no data, subsequent polling time intervals can be increased to minimize "null" data retrievals. Separately, a moving average of the amount of delay that data can incur between arriving at the remote server 108/110/112 and retrieval by the mobile wireless device 102 can also be used. When data incurs delays at the server, subsequent polling time intervals can be decreased to minimize the delay. Both metrics can be used in combination together.

FIG. 3 summarizes results for the polling methods illustrated in FIG. 2 when data arrives at the remote server 108/110/112 with a medium rate traffic pattern of 30 minutes apart. With a fixed 15 minute data retrieval polling time interval, the average delay incurred by the data is 0 minutes, while 4 "null" fetches occur in which no data returned from a poll. The fixed 15 minute data retrieval polling time interval minimizes delay but not the number of data retrievals that return no data. With a fixed 30 minute data retrieval polling time interval, the average delay incurred by the data increases to 15 minutes, while the number of data retrievals that return no data decreases to 0. With a fixed 60 minute data retrieval polling time interval, the average delay incurred by the data increases to 30 minutes, while the number of data retrievals that return no data remains at 0. Polling at 60 minute intervals increases delay, but reduces the number of polls, which can conserve battery power and reduce networking signaling traffic. The adaptive polling time interval balances the average delay and the number of data retrievals that return no data better than any single fixed data retrieval polling time interval. By adapting to the actual data traffic pattern, the average delay is 0 minutes, while the number of "null" fetches is 1.

Figure 4:
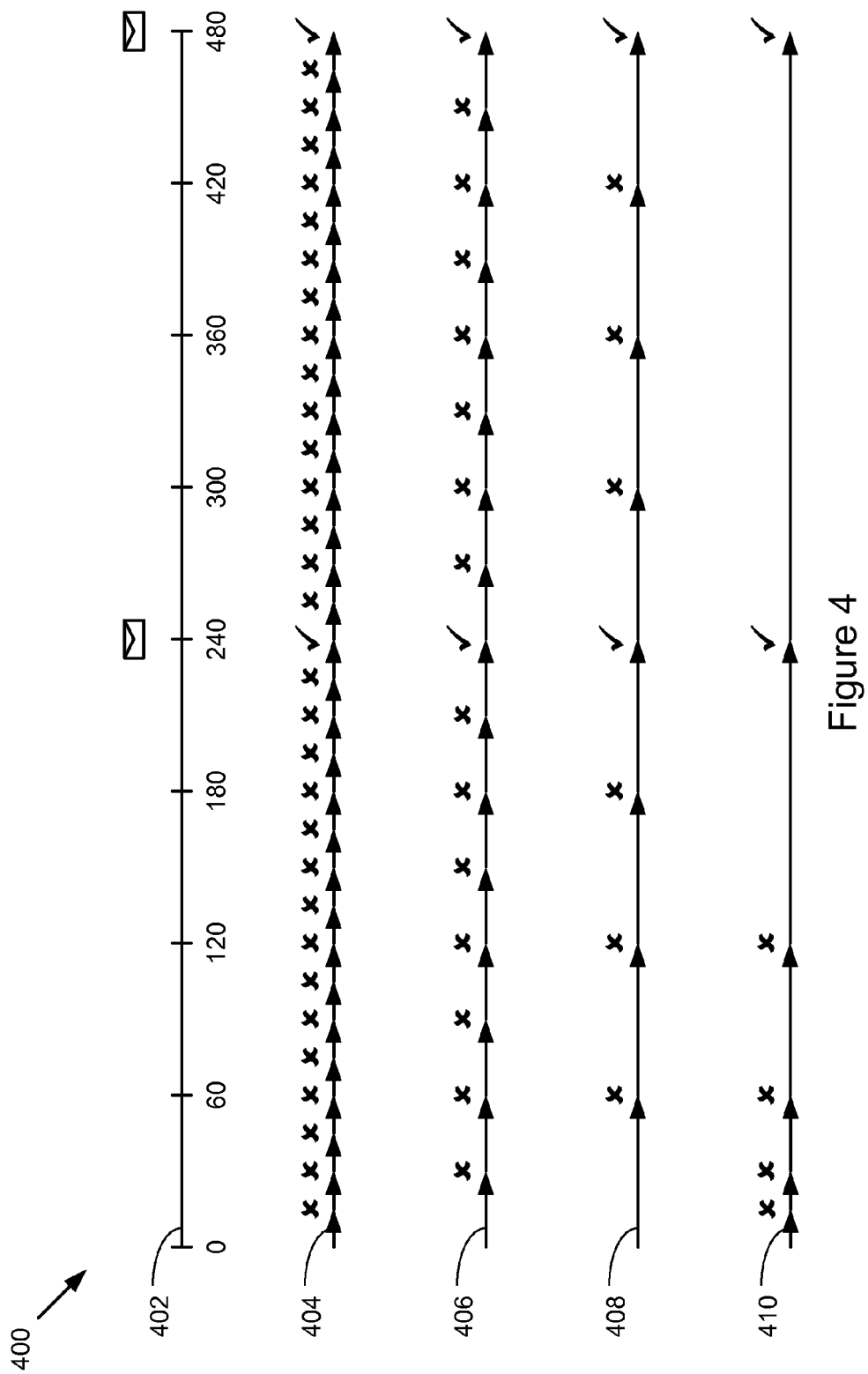
FIG. 4 illustrates different "pull" polling intervals for a low frequency data traffic pattern.

FIG. 4 illustrates the same set of data retrieval polling time intervals as shown in FIG. 2 applied to a low frequency data traffic pattern 400. The low frequency traffic pattern can represent data arrival times during night or a weekend, while the medium frequency traffic pattern can represent data arrival times during day or a weekday. With data arriving at the remote server 108/110/112 only every 2 hours (240 minutes), as indicated by the time line 402, using a fixed 15 minute time interval can result in a substantial number of polls that return no data. Similarly, a 30 minute time interval time line 406 and a 60 minute time line 408 also incur multiple polls with no data retrieval. The adaptive time interval time line 410 shows that the time interval can be progressively increased each time that a poll returns no data. The adaptive data retrieval time interval can continue to be increased after the first successful data retrieval at 240 minutes, as the time interval between two successful data retrievals can be still indeterminate.

FIG. 5 summarizes results for the polling methods illustrated in FIG. 4. While all polling methods incurred an average delay of 0 minutes, the number of polls that return no data ("null" fetches) decreases significantly when the polling time interval more closely matches the data arrival interval at the remote server 108/110/112. The fixed 15 minute data retrieval time interval resulted in 30 null fetches, the 30 minute fixed time interval resulted in 14 null fetches, and the 60 minute fixed time interval resulted in 6 null fetches over the four hour (480 minute) period illustrated. The adaptive data retrieval time interval increased the time between successive polls resulting in a lower number of only 4 null fetches.

Adaption of the data retrieval time intervals can include a number of different factors alone or in combination. Some factors can account for differences between the data traffic pattern arriving at the server and the polling time interval pattern. For example, one factor can be the time delay between when data arrives at the remote server 108/110/112 and when the mobile wireless device 102 retrieves the data from the server. The time delay can be calculated as a moving average over a time interval extending into the past for a number of polls that successfully retrieved data. The time when data arrives at the remote server 108/110/112 can be provided by the remote server 108/110/112 to the mobile wireless device 102. In some cases, no mechanism can be available to provide the actual time when data arrived at the remote server 108/110/112. Instead of the actual delay incurred by the data, an estimated delay can be calculated using the historical data retrieval information. The historical data retrieval information can be stored in the mobile wireless device 102 to be used in calculations for updating time between polls. Another factor can be the number of polls that retrieve no data, and a moving average of the number of "null" polls over a time interval can be used. Shortening the time interval between polls can reduce the delay but also can increase the number of "null" polls, so the adaption can balance the two requirements.

The adaption of the data retrieval time interval can weight most recent metric values more strongly than those further back in time. A representative algorithm to adapt the polling timer interval can proceed as follows. The timer interval can be initialized to a starting value. The starting value can be a minimum value that can poll rapidly to adapt quickly, or the starting value can be an average value based on historical data retrieval information. When a poll returns a sample data successfully, a delay "d" for the sample data can be calculated. The delay "d" can be calculated based on time stamp information provided by the remote server 108/110/112 or based on an estimate determined by the mobile wireless device 102. In a representative embodiment, the delay "d" can be the time period between samples of new data, i.e. the inter-arrival time at the mobile wireless device 102. In another representative embodiment, the delay "d" can be the inter-arrival time for data at the server. The data retrieval polling timer interval can be updated as a weighted average of the most recent delay combined with earlier delays using Equations (1), (2), (3) and (4).

$$T_{ave} = \frac{(1 - w_s)}{s - 1} \sum_{i=2}^{s} d_i + w_s d_1 \tag{1}$$

$$T_{offset} = w_{offset} T_{ave} \tag{2}$$

$$T_{final} = T_{ave} - T_{offset} \tag{3}$$

$$T_{final} = T_{ave} \tag{4}$$

In Equation (1), the most recently determined delay $d_1$ can be combined with previously determined delays $\{d_2, \ldots, d_s\}$ using a weighted average based on a weighting factor $w_s$. The weighting factor $w_s$ can be a number between 0 and 1, preferably greater than 0.5 to weight the most recent determined delay $d_1$ more heavily than the previously determined delays $\{d_2, \ldots, d_s\}$. Equation (1) can provide a weighted average delay $T_{ave}$ using the "s" most recently determined delays. A different weighting pattern can also be used, e.g. combining the "s" most recently determined delays using a truncated exponential distribution that weights the most recent determined delay most heavily. If the delays $\{d_1, \ldots, d_s\}$ used in Equation (1) represent the actual delay between the data arriving at the remote server 108/110/112 and the time when retrieved by the mobile wireless device 102, then the next polling time interval can use a time interval value of $T_{ave}$ as calculated by Equation (1). If, however, the delays $\{d_1, \ldots, d_s\}$ used in Equation (1) represent an estimated delay, such as the time between successive successful data retrievals by the mobile wireless device 102, then additional computations using Equations (2), (3) and (4) can be used to adapt the data retrieval time interval. The time between successful data retrievals can be longer than the actual delay, so the adaption can reduce the time interval accordingly.

Equation (2) calculates an offset value $T_{offset}$ that combines the calculated weighted average delay $T_{ave}$ determined from Equation (1) with an offset weighting factor $w_{offset}$. The offset weighting factor $w_{offset}$ can be a number between 0 and 1. With a small number offset weighting factor, the adaption can change more slowly than with a larger number offset weighting factor. A representative offset weighting factor can be ⅓. Then in Equation (3) a final delay value $T_{final}$ can be calculated by subtracting the offset value $T_{offset}$ from the weighted average delay $T_{ave}$. Equation (3) can be used when the most recent poll returned new data. Equation (4) can be used to calculate the final delay value $T_{final}$ when the most recent poll returned no new data. In a representative embodiment, the time delay "d" used in Equation (1) can be an inter-arrival time for sample data, and the weighted average delay $T_{ave}$ determined in Equation (1) can be a weighed average inter-arrival time.

When $T_{final}$ calculated in Equations (1) to (4) falls between a minimum time interval value $T_{min}$ and a maximum time interval value $T_{max}$, the data retrieval time interval can be updated to use $T_{final}$. When $T_{final}$ as determined by Equations (1) to (4) is less than the minimum time interval value $T_{min}$, then the data retrieval time interval can be set to use the minimum time interval value $T_{min}$. Similarly when $T_{final}$ exceeds the maximum time interval value $T_{max}$, then the data retrieval time interval can be set to use the maximum time interval value $T_{max}$. Bounding the minimum and maximum values for the data retrieval time interval can avoid very large delays for low traffic users and too frequent polling that can drain battery power for high traffic users.

In addition to adapting the time interval between successive polls, the mobile wireless device 102 can also adapt the time interval based on a time of day, day of the week or an historical pattern of data retrieval. For example, the time interval between polls can be initialized to a lower value during the day and to a higher value during the night. The rate of adaption can also be increased during transition time intervals, such as at 6 AM and 11 PM to more rapidly ramp between different time intervals that more closely match an expected data traffic pattern. Data retrieval patterns can also be analyzed over longer time periods, and one or more profiles can be created that can correspond to expected data traffic patterns for particular time periods, such as a work week day versus a weekend day. The user of the mobile wireless device 102 can also select a mode to indicate a current activity state (e.g. on vacation), and the time intervals between polls can account for the selected current activity state.

Figure 6:
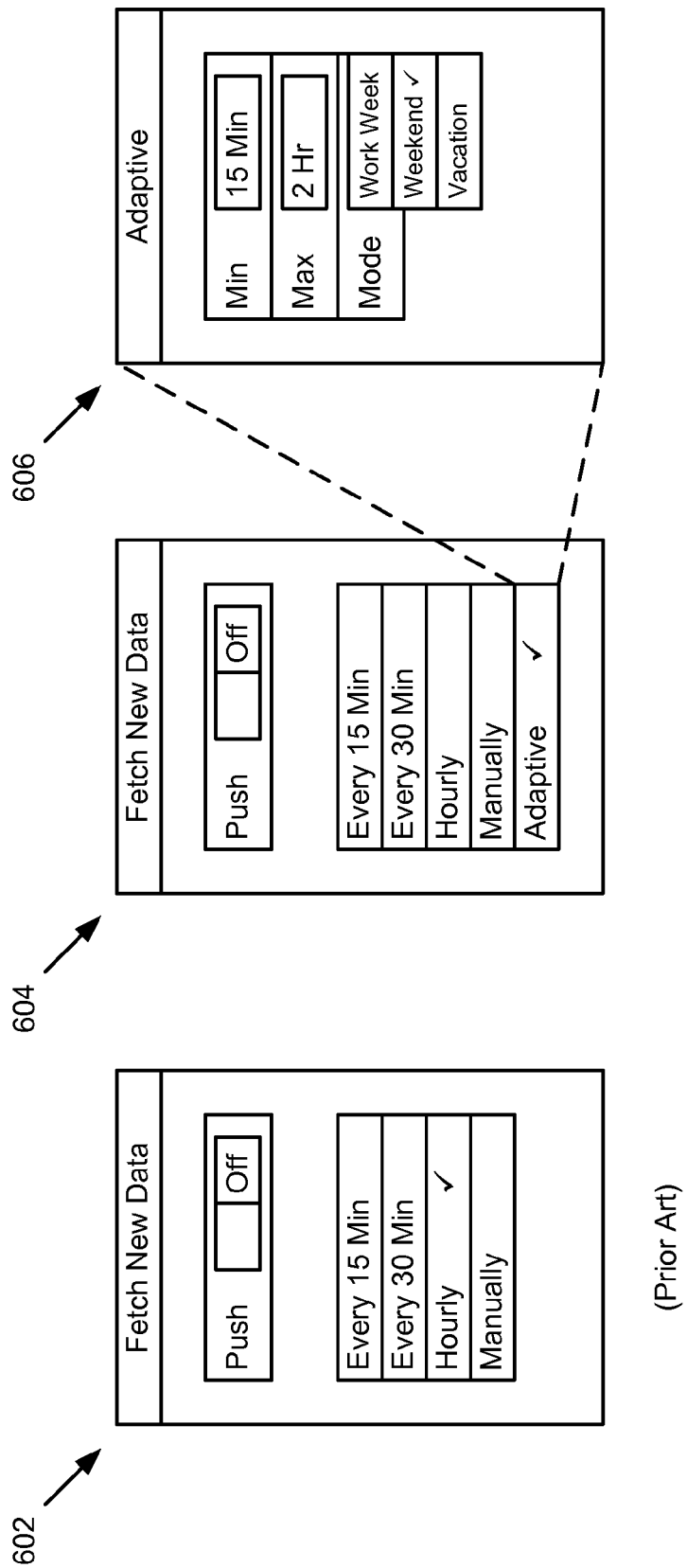
FIG. 6 illustrates three configuration panels for a mobile wireless device application.

FIG. 6 illustrates a set of configuration panels that can set various values for data retrieval by the mobile wireless device 102. The setting in the configuration panel can pertain to a particular service or to a set of services. In a prior art configuration panel 602, the user can select whether a push mode can be used by a service. If the push mode is "off", i.e. not selected or not available, then the user can select a fixed time interval value for a "pull" mode. Several options for the "pull" mode time interval between polls by the mobile wireless device 102 can be offered, such as every 15 minutes, every 30 minutes or hourly. The "pull" mode can also offer an option for a "manual" time interval that can require the user to open the application or provide another indication that a data retrieval poll be attempted.

As described herein, an adaptive setting can be added as shown in configuration panel 604, and values for several parameters that can affect the adaption of the data retrieval polling time interval can be selected as shown in configuration panel 606. A minimum polling time interval value, such as 15 minutes, and a maximum polling time interval value, such as 2 hours, can be specified. A mode, such as an activity state, can also be specified by the user. The settings entered by the user of the mobile wireless device 102 can then be used to influence the adaption of data retrieval time intervals as described herein.

Figure 7:
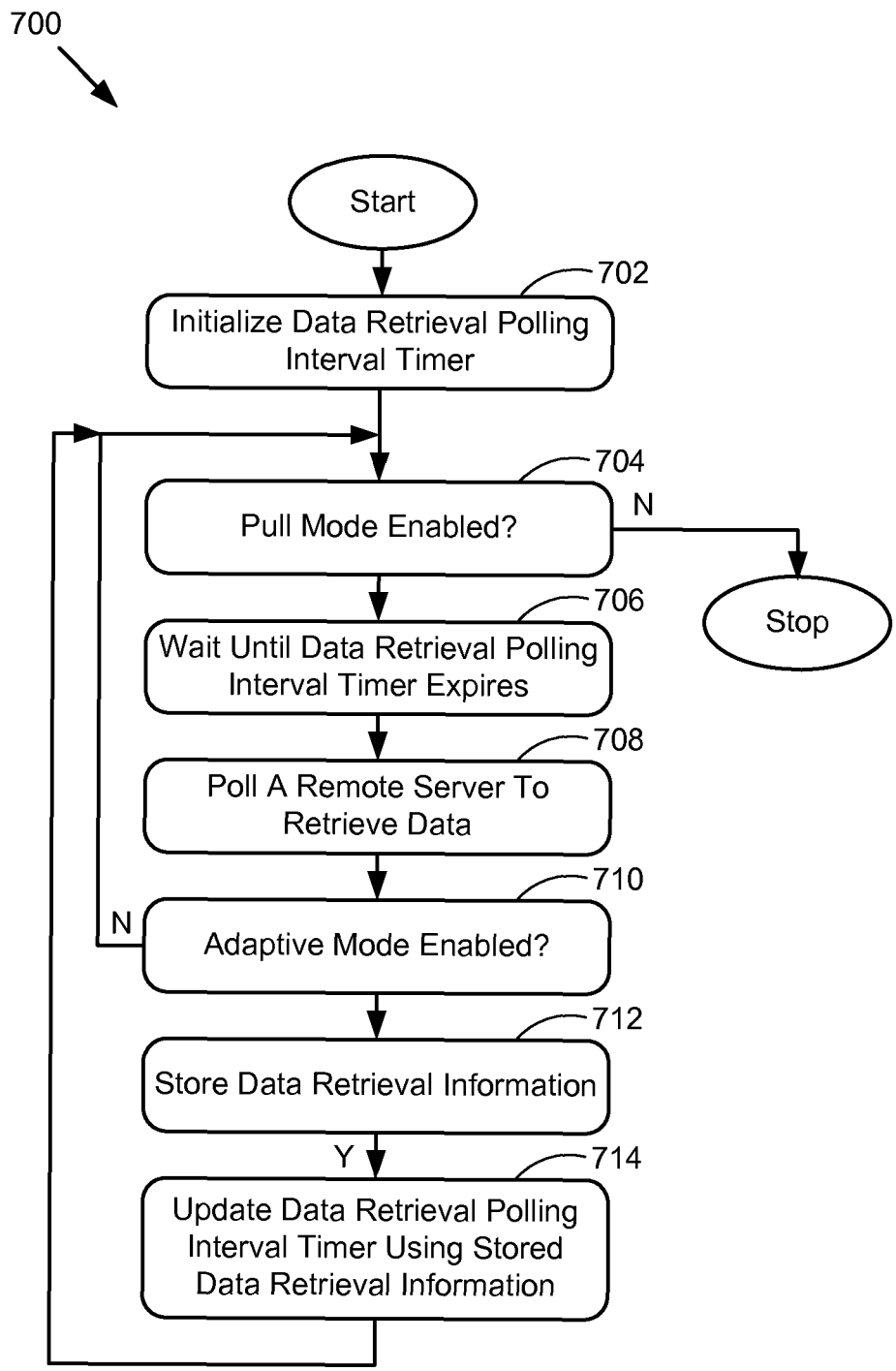
FIG. 7 illustrates a method for adapting a polling timer to a user data traffic pattern.

FIG. 7 illustrates a representative method 700 to adapt a data retrieval polling interval timer in a mobile wireless device 102. In step 702, the data retrieval polling interval time can be initialized to a starting value. In step 704, the mobile wireless device 102 can determine if a "pull" mode is enabled. If the "pull" mode is not enabled, then the adaption method can terminate. If the "pull" mode is enabled, then a timer data retrieval polling timer can start using a current data retrieval polling interval timer value, and in step 706, the mobile wireless device 102 can wait until the data retrieval polling interval timer expires. In step 708, the mobile wireless device 102 can poll a remote server 108/110/112 to retrieve any data that can arrive since the last poll. In step 710, the mobile wireless device 102 can determine if an adaptive mode is enabled. When no adaptive mode is enabled, the data retrieval polling interval timer can re-use the same value. When an adaptive mode is enabled, in step 712, the mobile wireless device 102 can store information about data retrieval. Representative information that can be stored can include time intervals between successive polls that successfully retrieve data, number of polls that do not return data and delay time intervals for data retrieved that can indicate the time between data arrival at the remote server 108/110/112 and data delivery to the mobile wireless device 102. In step 714, the data retrieval polling interval timer can be updated to a new value based on the stored data retrieval information.

Figure 8:
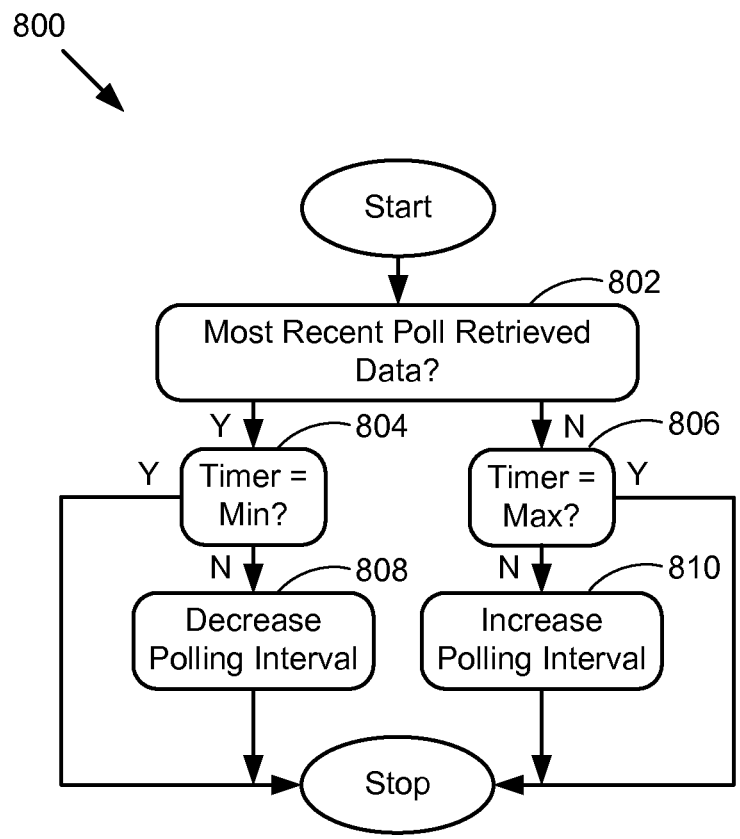
FIG. 8 illustrates additional steps for updating the polling timer based on user data retrieval information.

FIG. 8 illustrates additional steps 800 that can occur when an adaptive mode for updating the data retrieval polling interval timer can be enabled. In step 802, the mobile wireless device 102 can determine if the most recent poll retrieved data. When no data is returned by the most recent poll, then the mobile wireless device 102 can determine in step 806 if the data retrieval polling interval timer is set to a maximum value. If the data retrieval polling interval timer is set to a maximum value, then the data retrieval polling interval timer can be not updated. If the data retrieval polling interval timer is not set to a maximum value, then in step 810, the data retrieval polling interval timer value can be increased. The increased value can be calculated using one of a number of different adaption methods. One representative method can increase the polling interval timer value by a fixed amount, e.g. incrementing by a minimum step value. The minimum step value can be, for example, equal to the minimum polling interval timer value. Another representative method can increase the polling interval timer value by an amount proportional to the current value, e.g. by increasing by ⅓ or by doubling the value.

When data is returned by the most recent poll, as determined by the mobile wireless device 102 in step 802, then the mobile wireless device 102 can determine in step 804 if the data retrieval polling interval timer is set to a minimum value. If the data retrieval polling interval timer is set to a minimum value, then the data retrieval polling interval timer can be not updated. If the data retrieval polling interval timer is not set to a minimum value, then in step 808, the data retrieval polling interval timer can be decreased. The decreased value can be calculated using one of a number of different adaption methods. A representative method can determine a new polling interval value based on a weighted average of historical time delays. The historical time delays can be actual time delays encountered by the data retrieved or can be estimated time delays using time intervals between successive successful polls. In a representative embodiment, the time delay can be the time period between new data, i.e. inter-arrival time, for samples received at the mobile wireless device 102. In another representative embodiment, the time delay can be the inter-arrival time for new data received at the server. Another method can decrease the polling interval timer value by a fixed amount. Yet another method can decrease the value by a proportional amount based on the current timer value.

Figure 9:
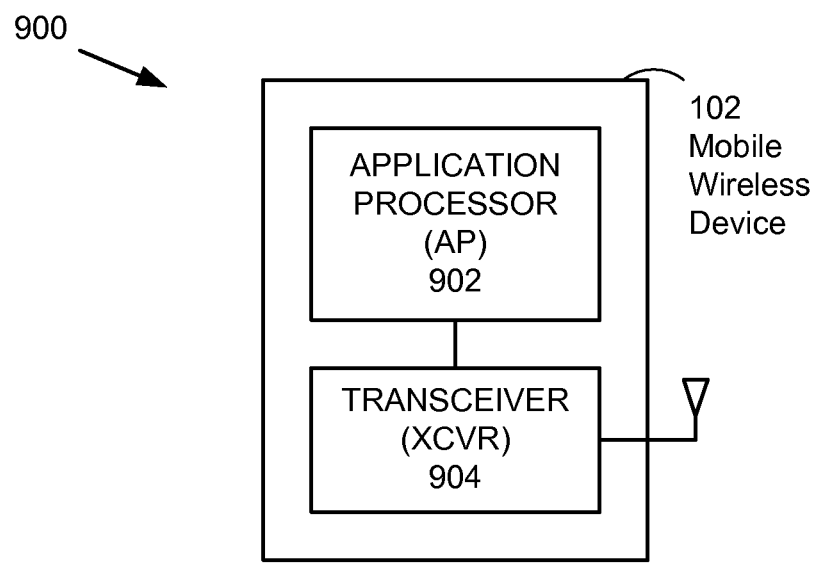
FIG. 9 illustrates a representative embodiment of a mobile wireless device.

FIG. 9 illustrates representative processing elements 900 in a mobile wireless device 102 that can be configured to implement a method for adapting a data retrieval polling interval timer. An application processor 902 in the mobile wireless device 102 can generate and receive data packets that can be communicated across a wireless network as well as manage operation of the mobile wireless device 102. Data packets can be exchanged between the application processor 902 and a transceiver 904. The transceiver can generate and receive radio signals that can contain the data packets for communication with the wireless network. The application processor 902 can determine when an adaptive mode is enabled to adapt a polling interval timer's values. The application processor can be configured to calculate and update the polling interval timer's values based on historical data retrieval information by the mobile wireless device 102 from a remote server 108/110/112. Separate applications can maintain distinct polling interval timers and adapt independently of other applications based on preferences set by the user of the mobile wireless device 102.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for adapting data retrieval polling in a mobile wireless device, the method comprising:
   polling a remote server by the mobile wireless device when a data retrieval polling timer expires;
   storing data retrieval information in the mobile wireless device, wherein the data retrieval information comprises a plurality of distinct historical time intervals, and wherein each distinct historical time interval is based on one or more of:
   (a) a time when the mobile wireless device retrieves data from the remote server, and
   (b) a time when the remote server receives data; and
   updating the data retrieval polling timer to a value based on a weighted average of N most recent distinct historical time intervals in the stored data retrieval information, N being an integer greater than one, and wherein updating the data retrieval polling timer comprises:
   increasing the data retrieval polling timer value when a most recent data retrieval poll retrieved no data and a current data retrieval polling timer value is less than a maximum polling interval value; and
   decreasing the data retrieval polling timer value when the most recent data retrieval poll retrieved data and the current data retrieval polling timer value is greater than a minimum polling interval value.

2. The method as recited in claim 1, wherein each distinct historical time interval is an interval between a data retrieval time when a data retrieval poll returns data and a data storage time when the data was received at the remote server.

3. The method as recited in claim 1, wherein updating the data retrieval polling timer further comprises:
   minimizing a moving average of the N most recent distinct historical time interval values; and
   minimizing a moving average of the number of data retrieval polls that return no data.

4. The method as recited in claim 1, wherein the weighted average uses averaging weights based on a current time of day and a current day of the week.

5. The method as recited in claim 1, wherein updating the data retrieval polling timer is based on a user selected rate adaptation preference.

6. The method as recited in claim 1, wherein updating the data retrieval polling timer is based on a user selected activity state.

7. A mobile wireless device configured to adapt data retrieval polling, the mobile wireless device comprising:
   a transceiver configured for transmitting and receiving wireless signals from a wireless network; and
   an application processor configured for:
   enabling an adaptive pull mode for the mobile wireless device;
   polling a remote server by the mobile wireless device when a data retrieval polling timer expires;
   storing data retrieval information, wherein the data retrieval information comprises a plurality of inter-arrival time intervals, and wherein each inter-arrival time interval is based on one or more of: (a) a time when data arrives at the remote server and (b) a time when a data retrieval poll returns data; and updating the data retrieval polling timer to a value based on at least a portion of the plurality of inter-arrival time intervals in the stored data retrieval information, wherein updating the data retrieval polling timer comprises:

increasing the data retrieval polling timer value when a current data retrieval polling timer value is less than a moving average of historical inter-arrival time intervals and a current data retrieval polling timer value is less than a maximum polling interval value; and decreasing the data retrieval polling timer value when the current data retrieval polling timer value is greater than the moving average of historical inter-arrival time intervals and the current data retrieval polling timer value is greater than a minimum polling interval value, and wherein the moving average of historical inter-arrival time intervals is based on a weighted average of N most recent inter-arrival time intervals in the stored data retrieval information, N being an integer greater than one.

8. The mobile wireless device as recited in claim 7, wherein each inter-arrival time interval is an interval between successive data retrieval polls that returned data.

9. The mobile wireless device as recited in claim 7, wherein each inter-arrival time interval is an interval between a data retrieval time when a data retrieval poll returns data and a data storage time when the data was received at the remote server.

10. The mobile wireless device as recited in claim 7, wherein the moving average of historical inter-arrival time intervals weights the most recently determined inter-arrival time interval more than the previously determined inter-arrival time intervals.

11. The mobile wireless device as recited in claim 7, wherein the moving average of historical inter-arrival time intervals uses weights based on one or more of: a current time of day, a current day of the week and a user selected activity state.

12. A non-transitory computer readable medium for storing non-transitory computer program code executed by a processor for adapting data retrieval timing from a remote server by a mobile wireless device, the non-transitory computer readable medium comprising:

non-transitory computer program code configured for polling the remote server by the mobile wireless device when a data retrieval polling timer expires;

non-transitory computer program code configured for storing data retrieval information in the mobile wireless device, wherein the data retrieval information comprises a plurality of distinct historical time intervals, and wherein each distinct historical time interval is based on one or more of: (a) a time when data is retrieved by the mobile wireless device and (b) a time when data arrives at the remote server;

non-transitory computer program code configured for updating the data retrieval polling timer to a value based on a weighted average of N most recent distinct historical time intervals in the stored data retrieval information, N being an integer greater than one;

non-transitory computer program code configured for increasing the data retrieval polling timer value when a most recent data retrieval poll retrieved no data and a current data retrieval polling timer value is less than a maximum polling interval value; and non-transitory computer program code configured for decreasing the data retrieval polling timer value when the most recent data retrieval poll retrieved data and the current data retrieval polling timer value is greater than a minimum polling interval value.

13. The non-transitory computer readable medium as recited in claim 12, wherein each distinct historical time interval is an interval between successive data retrieval polls that returned data.

14. The non-transitory computer readable medium as recited in claim 12, wherein each distinct historical time interval is an interval between a data retrieval time when a data retrieval poll returns data and a data storage time when the data was received at the remote server.

15. The non-transitory computer readable medium as recited in claim 12, wherein each distinct historical time interval is an interval between successive data received for a user of the mobile wireless device at the remote server.

16. The non-transitory computer readable medium as recited in claim 12, further comprising:

non-transitory computer program code configured for updating the data retrieval polling timer by minimizing a moving average of the N most recent distinct historical time interval values.

17. The non-transitory computer readable medium as recited in claim 12, further comprising:

non-transitory computer program code configured for updating the data retrieval polling timer by minimizing a moving average of the number of data retrieval polls that return no data.

18. The non-transitory computer readable medium as recited in claim 12, further comprising:

non-transitory computer program code configured for increasing the data retrieval polling timer value when the current data retrieval polling timer value is less than the weighted average of N most recent distinct historical time intervals and the current data retrieval polling timer value is less than the maximum polling interval value; and non-transitory computer program code configured for decreasing the data retrieval polling timer value when the current data retrieval polling timer value is greater than the weighted average of N most recent historical time intervals and the current data retrieval polling timer value is greater than the minimum polling interval value.

19. The mobile wireless device as recited in claim 7, wherein each inter-arrival time interval is an interval between successive data that arrives at the remote server.

20. The method as recited in claim 1, wherein each distinct historical time interval is an interval between successive data retrieval polls that returned data.

21. The method as recited in claim 1, wherein at least one of the plurality of distinct historical time intervals is an interval based on time stamp information provided by the remote server.

22. The method as recited in claim 1, wherein each distinct historical time interval is an interval between successive data that arrives at the remote server.

23. The method as recited in claim 1, wherein each distinct historical time interval in the weighted average of N most recent distinct historical time intervals is weighted equally.

24. The mobile wireless device as recited in claim 7, wherein each inter-arrival time interval in the weighted average of N most recent inter-arrival time intervals is weighted equally.

25. The mobile wireless device as recited in claim 12, wherein each distinct historical time interval in the weighted average of N most recent distinct historical time intervals is weighted equally.

* * * * *